United States Patent [19]
Ishikawa et al.

[11] Patent Number: 5,345,245
[45] Date of Patent: Sep. 6, 1994

[54] DIFFERENTIAL DATA SIGNAL TRANSMISSION TECHNIQUE

[75] Inventors: Hiroyasu Ishikawa, Tokyo; Hideo Kobayashi, Fujimi; Toshio Mizuno, Sayama, all of Japan

[73] Assignee: Kokusai Denshin Denwa Company, Limited, Tokyo, Japan

[21] Appl. No.: 82,006

[22] Filed: Jun. 24, 1993

[30] Foreign Application Priority Data

Jul. 1, 1992 [JP] Japan ................... 4-174275

[51] Int. Cl.$^5$ ........................................... G01S 05/02
[52] U.S. Cl. .................................................. 342/357
[58] Field of Search .................. 342/357, 358, 457; 364/449

[56] References Cited

U.S. PATENT DOCUMENTS

| | | | |
|---|---|---|---|
| 5,222,099 | 6/1993 | Hori et al. | 342/357 |
| 5,225,842 | 7/1993 | Brown et al. | 342/357 |
| 5,245,628 | 9/1993 | LaPadula, III et al. | 342/357 |

OTHER PUBLICATIONS

Sky Fix and Delta Fix SR, Differential GPS Products, Racal Positioning Systems Limited, New Malden, Surrey KT3 4NR, England (six pages of descriptive material and specification).

*Primary Examiner*—Mark Hellner
*Attorney, Agent, or Firm*—Jordan and Hamburg

[57] ABSTRACT

Differential data signal transmission technique, providing a differential data signal transmission technique inclusive of the correcting factor that requires no transmitter/receiver other than the GPS receiver, comprises the use of a differential ranging system where spread spectrum signals (SS signal) are multiplied at the same frequency, transmission rate, and modulation method used by the GPS satellites, but with different codes from those used by the GPS satellites, the SS signals used to transmit correcting factor from an earth station on the ground to a mobile station on the ground carrying a GPS receiver via a geostationary orbit satellite or a low earth orbit satellite.

3 Claims, 6 Drawing Sheets

DIFFERENTIAL DATA SIGNAL TRANSMISSION TECHNIQUE

BACKGROUND OF THE INVENTION

This invention relates to the data signal transmission technique for differential ranging systems using Global Positioning System (hereinafter referred to as GPS) satellites, said differential ranging systems having applications including a navigation system for such mobile terminals mounted on as automobiles, vessels, and aircraft and for the exploration of underground resources and maritime resources.

Drawings are used to show the configurations of conventional differential ranging systems. FIG. 5 shows the configuration of a commonly used differential ranging system and FIG. 6 the configuration of a differential ranging system available from Racal Survey Corporation.

In the Figures, A is a fixed reference station, B is a mobile station, Sa to Sc are GPS satellite orbit information received from GPS satellites 4a to 4c, 1 is a GPS receiver installed at fixed reference station A and mobile station B, 2 is a data processing interface, 3 is a radio that links by radio channel fixed reference station A and mobile station B, 4a to 4c are GPS satellites, and 5 is a radio channel.

4α is INMARSAT satellite made available by International Maritime Satellite Organization (hereinafter referred to as INMARSAT satellite), C is the mobile bodies like a vessel, 6 and 7 are links of INMARSAT satellite 4α, D is a GPS receiver, E is a transmitter/receiver for using INMARSAT satellite 4α, and F is an earth station for transmitting data to INMARSAT satellite 4α.

Conventional differential ranging systems have had problems such as those described below.

First, a commonly used differential ranging system such as the one shown in FIG. 5 achieves the differential ranging function by deriving the correcting factor at fixed reference station A by using GPS receiver 1 and data processing interface 2, and sending the error information from radio 3 installed at fixed reference station A to mobile station B via radio channel 5.

In this case, however, it is necessary to employ at mobile station B radio 3, apart from GPS receiver 1, and a receiving antenna, as well as data processing interface 2 for processing the data between radio 3 that receives the correcting factor and existing GPS receiver 1. These requirements have made the differential ranging system as a whole quite large, which has created the problems of cost and installation space when used as a navigation system for automobiles, vessels, etc.

In addition, since the conventional differential ranging system required a separate frequency on radio channel 5 over the link for transmitting the correcting factor, it posed a problem also in terms of effective use of radio frequencies.

In the differential ranging system supplied by Racal Survey Corporation as shown in FIG. 6, fixed reference station A uses INMARSAT satellite 4α to transmit differential data signals over circuits 6 and 7 to user C on a vessel, etc.

In this case, as user C needs to install, apart from GPS receiver D, transmitter/receiver E on his vessel to use INMARSAT satellite 4α links 6 and 7, the system makes it impossible, due to its cost and space requirement, to install the necessary equipment on a small vessel or automobile, and has forced the user to seek an alternative means.

The invention, to solve said problems with conventional differential ranging systems, provides a differential data signal transmission technique inclusive of the correcting factor that requires no transmitter/receiver other than the GPS receiver.

SUMMARY OF THE INVENTION

Said problems with conventional technology are solved by this invention by employing the following exclusive embodiment techniques.

In essence, the invention, a differential data signal transmission technique, said technique having exclusive properties comprising: the use of a differential ranging system where spread spectrum signals (SS signals) are multiplied at the same frequency, transmission rate, and modulation method used by GPS satellites, but with different codes from those used by said GPS satellites, said SS signals being used to transmit the correcting factor from an earth station on the ground to a mobile station on the ground carrying a GPS receiver via a geostationary orbit satellite or a low earth orbit satellite; wherein said differential ranging system entails, as part of a GPS satellite ranging system employing more than one GPS satellite: installing a GPS receiver at a fixed reference station with a known position; transmitting the correcting factor from the fixed reference station to a mobile station carrying a GPS receiver in the service area, said correcting factor being the difference between the measured range from a GPS satellite to the fixed reference station and the true range from the GPS satellite to the fixed reference station, which is calculated from the orbit information of the GPS satellite and the true position of the fixed reference station; and the mobile station carrying a GPS receiver deleting the propagational range error included in the distance between the GPS satellite and itself that it had measured beforehand from the correcting factor received from the fixed reference station, and performing a ranging operation.

The invention, a differential data signal transmission technique, has the second exclusive properties of such that in the first exclusive properties of the invention: the code spreading technique generates spread spectrum signals with as many spread codes (pseudo random noise codes), each corresponding to a service area, as there are service areas in each of which a fixed reference station is installed, said code spreading technique multiplexing the multiple spread spectrum signals and transmitting differential data signals.

The invention, a differential data signal transmission technique, has the third exclusive properties of such that in the first exclusive properties of the invention: the code spreading technique multiplexes with area identity numbers over a time axis as many differential data signals, each corresponding to a service area, as there are service areas in each of which a fixed reference station is installed, said code spreading technique transmitting differential data signals as time division multiplexed waves (TDM)-SS.

The invention employs the embodiment technique such as that mentioned above. The differential data signals composed of the correcting factor derived at a number of fixed reference stations are transmitted as spectral spread signals spread at the same frequency, transmission rate, and modulation method used by the GPS satellites, but with different codes from those used by said GPS satellites, from an earth station to a mobile station on the ground carrying a GPS receiver via a geostationary orbit satellite or a low earth orbit satellite other than a GPS satellite. Therefore, the invention allows the mobile station carrying a GPS receiver to perform high-precision ranging using a simple, compact GPS receiver composed of an existing GPS receiver incorporating a processor for processing the differential data signals.

In essence, as the differential data signals are transmitted at the same frequency signals as those of GPS satellites, the differential data signals can be received with existing GPS antennas. In addition, as the differential data signals employ the same modulation method and are of the same transmission rate as the GPS satellite frequency signals, they can be demodulated with existing GPS receivers.

In this case, however, it is necessary to attach certain spread codes to the differential data signal in order to differentiate the conventional orbit information transmitted by GPS satellites from the correcting factor. Although it is also necessary to incorporate a new processor to independently process the differential data signals, this requires only a software modification, and does not require additional hardware.

DETAILED DESCRIPTION OF THE INVENTION

Drawings are used to describe an embodiment example of the invention.

Figure 1:
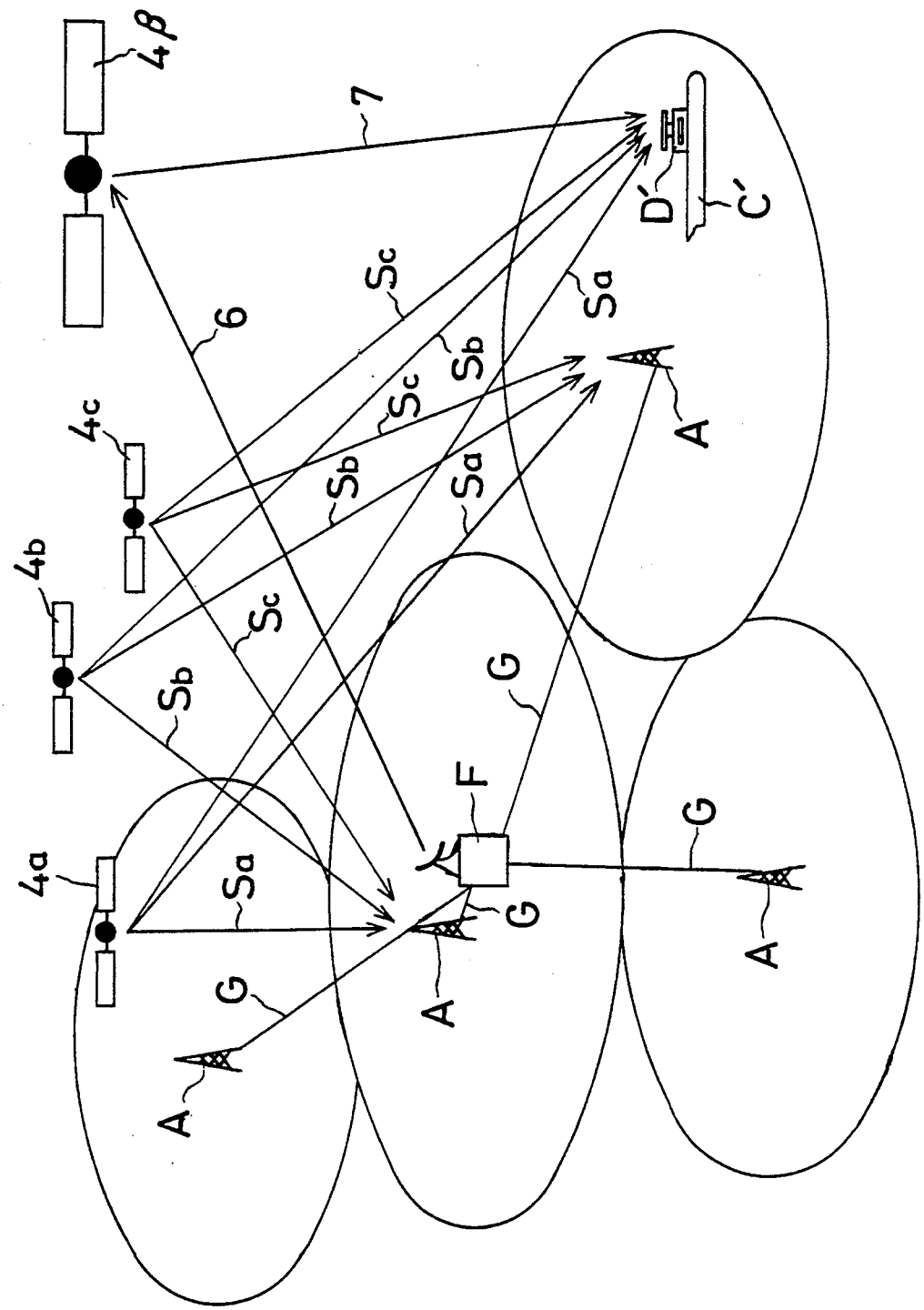
FIG. 1 is a figure showing a sample system to which the embodiment example of the invented technique is applied.

FIG. 1 shows a sample system to which the invention is applied. In the figure, C' is a mobile user carrying a GPS receiver on a vessel, etc., G is a terrestrial line or radio link that connects fixed reference station A with earth station F, $4\beta$ is a geostationary orbit satellite such as INMARSAT or a low earth orbit satellite that is different from GPS satellite (hereinafter referred to as a non-GPS satellite). Facilities that are the same as those used in prior descriptions are denoted by the same symbols.

Next, the embodiment example employing the sample system is described by referring to the figure.

First, the ground is divided into a number of differential range effective areas (radius of 1,000 km or less), and fixed reference station A for differential ranging is installed in each service area.

Fixed reference station A transmits error information to ground station F over terrestrial line or radio link G, where said the correcting factor is the propagation range error or the difference between the true range from a GPS satellite to the fixed reference station, which is derived from the orbit information obtained from GPS satellites $4a$ through $4c$ and the position of the fixed reference station, and the measured range from a GPS satellite to the fixed reference station, which is derived by receiving transmitted signals Sa through Sc obtained from GPS satellites $4a$ through $4c$.

In this case, each fixed reference station A transmits the correcting factor to earth station F, where said the correcting factor includes the service area number where the fixed reference station is located, the area identity numbers of GPS satellites $4a$ through $4c$ the fixed reference station derived, and the propagation range error of said GPS satellites $4a$ through $4c$.

The correcting factor transmitted from each fixed reference station A over terrestrial link G is converted into data matching the differential data format at earth station F. Then, the data is transmitted to non-GPS satellite $4\beta$ as SS signals spread at different pseudo random noise codes (gold codes of 1,023 in spread code length) at the frequency of 1,575.42 MHz, which is the same frequency used by GPS satellites $4a$ through $4c$, and at the spread rate of 1.023 Mbps.

At the non-GPS satellite $4\beta$, the signals received from earth station F are amplified, then transmitted to mobile user C' on a seagoing vessel, etc., as differential data signals.

The ranging procedures performed by mobile user C' on a seagoing vessel, etc., are described below.

First, mobile user C' uses GPS receiver D' on its mobile station to derive the orbit information from each of GPS satellites $4a$ through $4c$ included in the SS signals Sa through Sc received from each of GPS satellites $4a$ through $4c$ by correlating the spread codes corresponding to each of GPS satellites $4a$ through $4c$.

Using this orbit information, the measured range between mobile user C' and each GPS satellite is calculated. At the same time, GPS receiver D' is able to detect the differential data signals included in the SS signals received from non-GPS satellite $4\beta$ by performing a correlation with the spread codes allocated for the differential data signals.

After decoding the differential data signals, and deleting the propagational range error included in each of GPS satellites $4a$ through $4c$ from the measured distance between GPS satellite and user with the use of an arithmetic circuit, a conventional ranging calculation is performed to obtain an extremely high-precision ranging.

Figure 2:
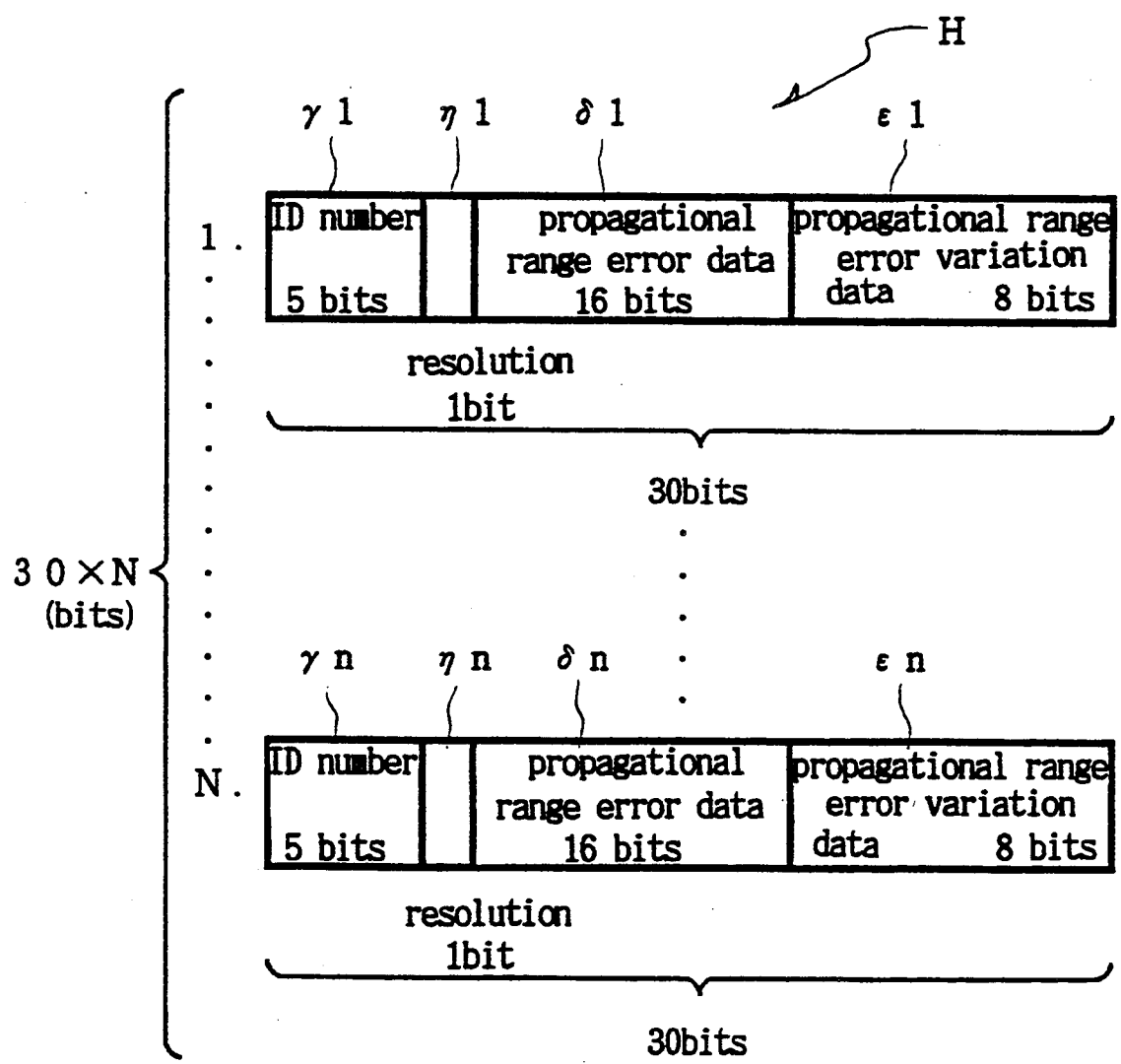
FIG. 2 is a figure showing a sample frame format of the invented technique, differential data signal.

FIG. 2 show a sample frame format for the differential data signals.

In FIG. 2, one frame comprises for each GPS satellite 5 bits of ID number $\gamma$, 16 bits of propagational range error data $\delta 1$, 8 bits of propagational range error variation rate $\epsilon 1$, and 1 bit of error data resolution $\eta 1$, for a total of 30 bits of sub-frame H. When transmitting the correcting factor on N number of different GPS satellites, one information frame would contain $30 \times N$ bits. Here, there are two ways of transmitting differential data signals to mobile user C' carrying a GPS receiver on ground.

(1) Multiplex SS signals with as many spread codes, each corresponding to an area, as there are service areas where fixed reference station A is installed.

Figure 3:
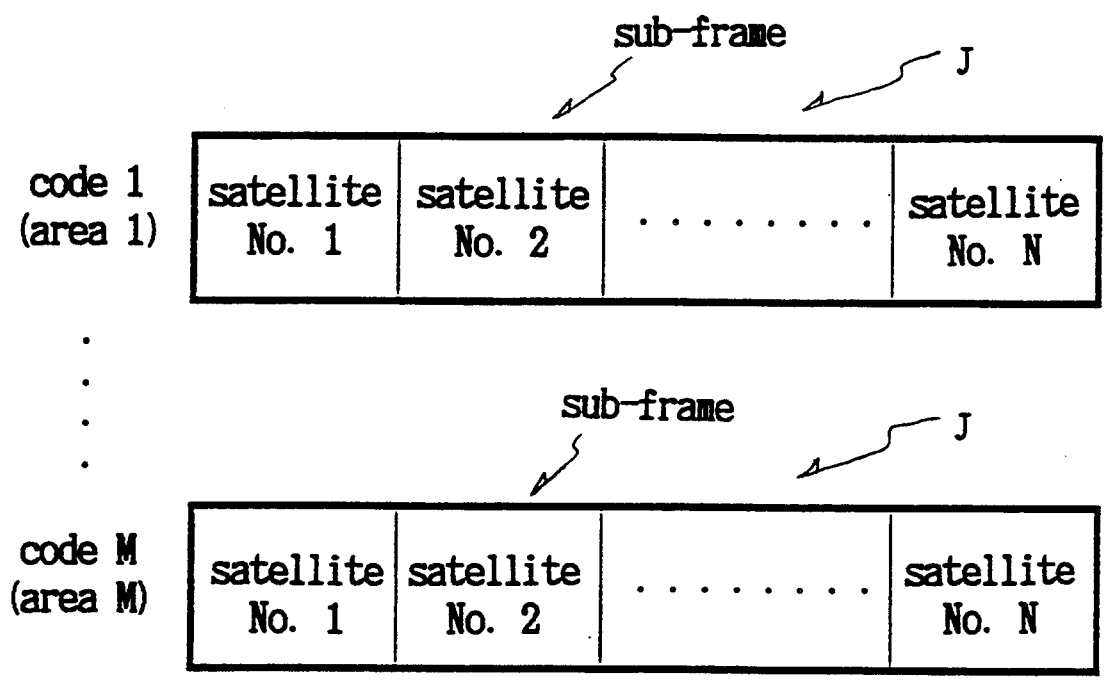
FIG. 3 is a sample configuration of a data frame employing the invented technique of multiplexing SS signals with as many spread codes, each corresponding to a service area, as there are service areas where a fixed reference station is installed.

This method entails generating SS signals with M number of different spread codes, where M is also the number of areas where fixed reference station A is installed, then multiplexing the SS signals and sending the signals via non-GPS satellite 4β. FIG. 3 shows a sample configuration of this data frame.

In FIG. 3, the basic frame for each area comprises N number of sub-frames J, and a different spread code is allocated to each area.

Given the total number of areas as M, this method would entail transmitting M number of multiplexed SS signals from earth station F.

Mobile user C' is able to know the differential range service area that he is in by first performing a conventional independent GPS ranging using GPS satellites 4a through 4c. As each service area is allocated a spread code to distinguish itself from other service areas, mobile user C' is able to derive the differential data signals for range calculation corresponding to his own station by using the spread code corresponding to the service area he is in to correlate the received signals.

(2) Transmission to mobile station carrying a GPS signal receiver using TDM (Time Division Multiplexing) method.

Figure 4:
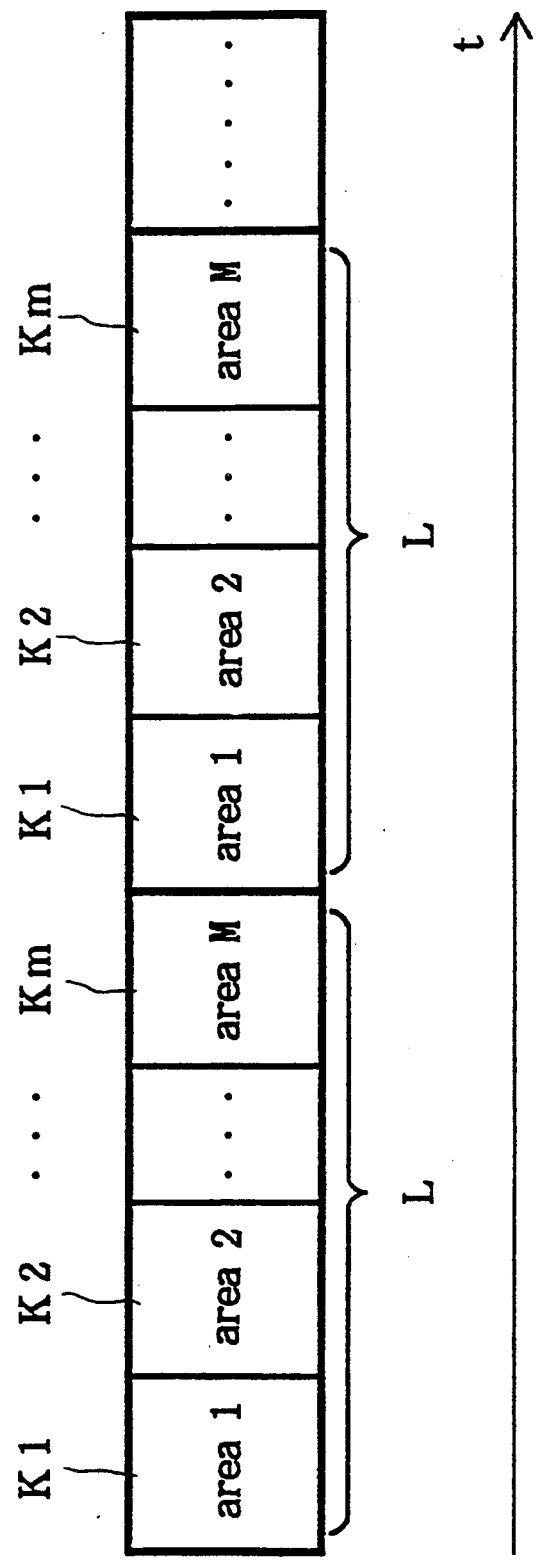
FIG. 4 is a sample configuration of a data frame employing the invented TDM technique.
Figure 5:
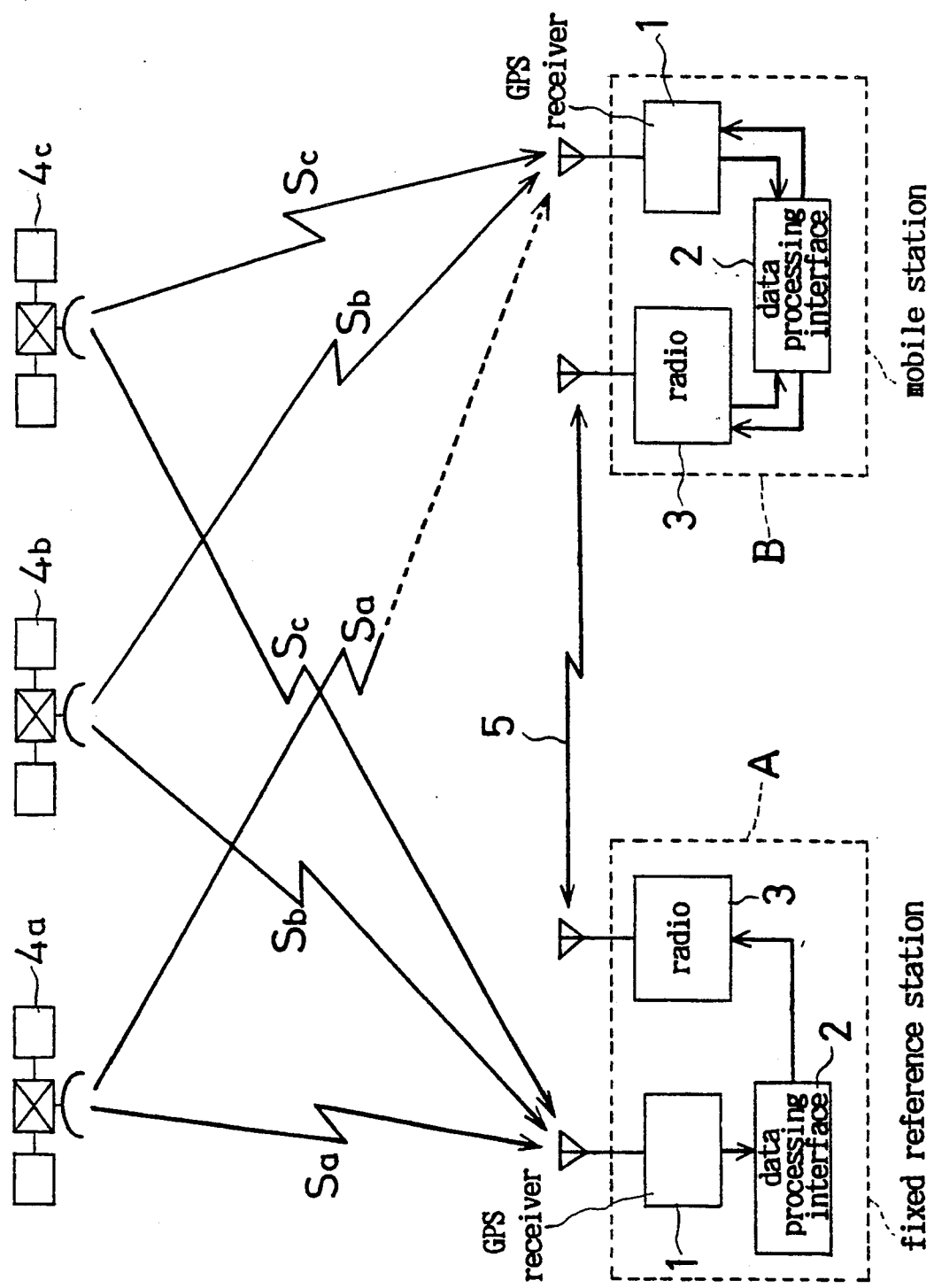
FIG. 5 is a figure showing the configuration of a differential ranging system that has been commonly used.
Figure 6:
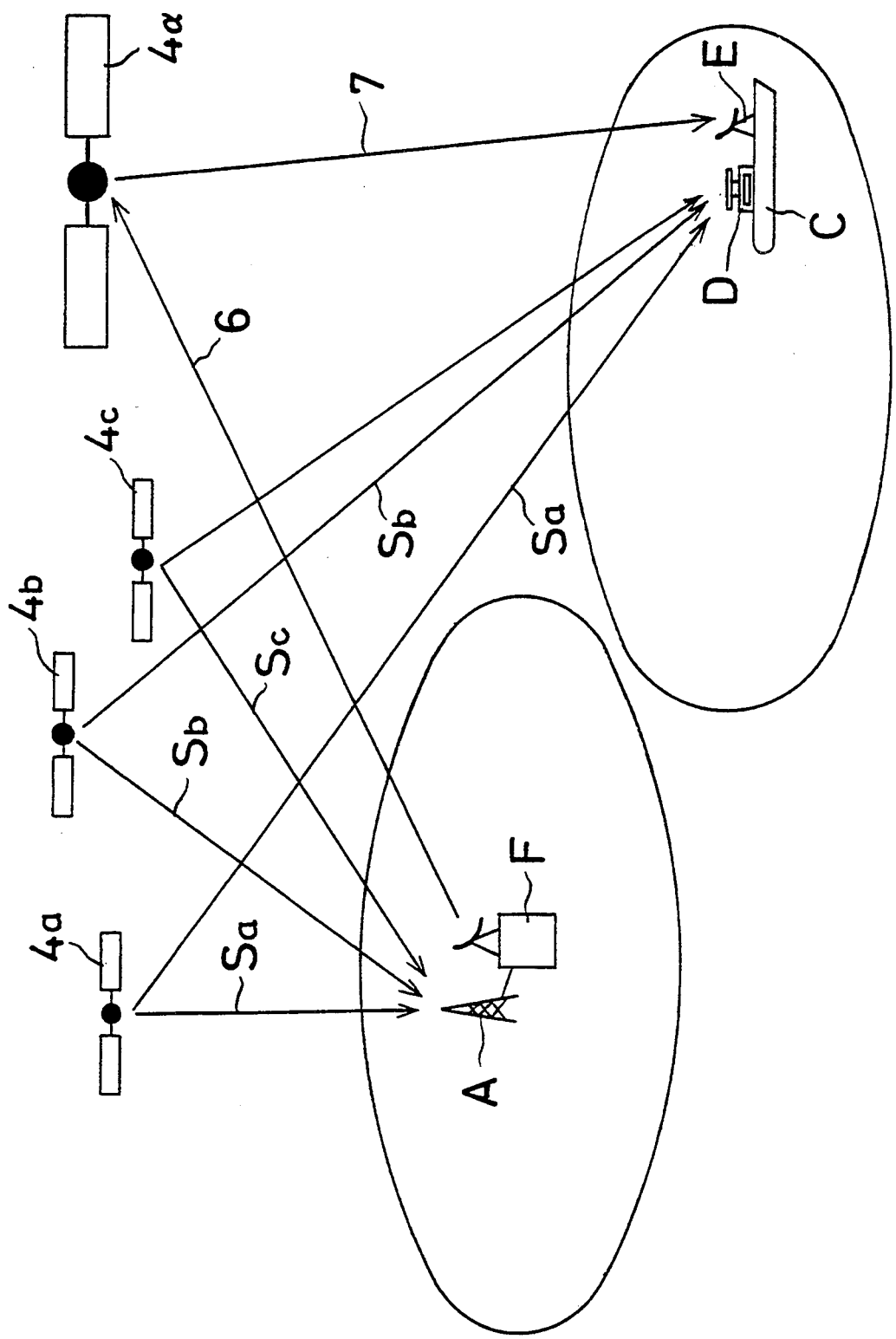
FIG. 6 is a figure showing the configuration of a differential ranging system available from Rascal Survey Corporation.

This technique entails multiplexing with area identity numbers over a time axis as many differential data signals as there are service areas where fixed reference station A is installed. After the information signals are spread using differential data signal transmission spread codes, they are transmitted via non-GPS satellite 4β as SS-TDM signals. FIG. 4 shows a sample configuration of this data frame.

In the figure, repeating signals of long frame L, which comprises M number of basic frame Kn (n=1−M) as TDM signals.

However, differential data signals are updated for every long frame L, making it possible to constantly provide users with updated information.

Mobile user C' is able to know the differential range service area that he is in by first performing a conventional independent GPS ranging using GPS satellites 4a through 4c.

Each service area is allocated an ID number for identifying the area. Mobile user C' is able to derive the differential data signals for range calculation corresponding to his own station by correlating the received signals with differential data signal spread codes to derive the information data series, then detecting basic frames K1 through KM corresponding to the identity number of the service area he is in.

As described above, the use of the invention, differential data signal transmission technique, will provide GPS ranging system users with an extremely high-precision ranging service at a cost that is similar to that of current independent ranging systems.

In addition, for the mobile station on the ground carrying a GPS receiver, the incorporation of a processor for performing differential ranging into an existing GPS receiver will provide high-precision ranging that is superior both in terms of size and cost when compared to current differential ranging systems.

What we claimed is:

1. A differential data signal transmission technique, said technique having exclusive properties comprising:

the use of a differential ranging system where spread spectrum signals (SS signals) are multiplied at the same frequency, transmission rate, and modulation method used by GPS satellites, but with different codes from those used by said GPS satellites, said SS signals being used to transmit the correcting factor for the improvement of ranging accuracy from an earth station on the ground to a mobile station on the ground carrying a GPS receiver via a geostationary orbit satellite or a low earth orbit satellite;

wherein said differential ranging system entails, as part of a GPS satellite ranging system employing more than one GPS satellite:

installing a GPS receiver at a fixed reference station with a known position;

transmitting the correcting factor from the fixed reference station to a mobile station carrying a GPS receiver in the service area, said correcting factor being the difference between the measured range from a GPS satellite to the fixed reference station and the true range from the GPS satellite to the fixed reference station, which is calculated from the orbit information of the GPS satellite and the true position of the fixed reference station; and the mobile station carrying a GPS receiver deleting the propagational range error included in the distance between the GPS satellite and itself that it had measured beforehand from the correcting factor received from the fixed reference station, and performing a ranging operation.

2. A differential data signal transmission technique according to the claim 1, wherein the exclusive properties comprise:

a code spreading technique that generates spread spectrum signals with as many spread codes (pseudo random noise codes), each corresponding to a service area, as there are service areas in each of which a fixed reference station is installed, said code spreading technique multiplexing the multiple spread spectrum signals and transmitting differential data signals.

3. A differential data signal transmission technique according to the claim 1, wherein the exclusive properties comprise:

a code spreading technique multiplexes with area identity numbers over a time axis as many differential data signals, each corresponding to a service area, as there are service areas in each of which a fixed reference station is installed, said code spreading technique transmitting differential data signals as time division multiplexed waves (TDM)-SS.

* * * * *